United States Patent [19]

Nesheiwat et al.

[11] Patent Number: 5,328,981
[45] Date of Patent: Jul. 12, 1994

[54] RECOVERY OF POLY(ARYLENE SULFIDE KETONE) AND POLY(ARYLENE SULFIDE DIKETONE) RESINS

[76] Inventors: Afif M. Nesheiwat, 292-G Main St., Madison, N.J. 07940; Jon F. Geibel, 2600 Mountain Rd., Bartlesville, Okla. 74003

[21] Appl. No.: 794,768

[22] Filed: Nov. 19, 1991

Related U.S. Application Data

[62] Division of Ser. No. 459,011, Dec. 29, 1989, Pat. No. 5,091,509.

[51] Int. Cl.$^5$ ............................ C08G 2/00; C08F 6/00; C08J 3/00
[52] U.S. Cl. .................................. 528/481; 528/226; 528/480; 528/499
[58] Field of Search ................ 528/226, 480, 481, 499

[56] References Cited

U.S. PATENT DOCUMENTS

| | | | |
|---|---|---|---|
| 3,800,845 | 4/1974 | Scoggin | 159/47 |
| 4,232,142 | 11/1980 | Barr et al. | 528/125 |
| 4,361,693 | 11/1982 | Jansons | 528/86 |
| 4,415,729 | 11/1983 | Scoggins et al. | 528/388 |
| 4,730,034 | 3/1988 | Nesheiwat et al. | 528/388 |
| 4,748,231 | 5/1988 | Nesheiwat | 528/486 |

FOREIGN PATENT DOCUMENTS 0156131 10/1985 European Pat. Off. .

Primary Examiner—John Kight, III
Assistant Examiner—T. Mosley

[57] ABSTRACT

A poly(arylene sulfide ketone) or poly(arylene sulfide diketone) resin having improved handling characteristics is prepared by a process comprising preparing in a first enclosed vessel a slurry comprising a solid poly(arylene sulfide ketone) or poly(arylene sulfide diketone) resin and a liquid polar organic compound, and optionally water; then substantially liquifying the resin to form a mixture comprising substantially liquified resin and polar organic compound; then flashing the mixture into a second vessel having a pressure lower than the first vessel, thereby removing a portion of the polar organic compound and solidifying the resin.

When the slurry further comprises water, the invention method optionally includes a venting step prior to the substantial liquification of the resin and/or a concentration step after the substantial liquification of the resin.

20 Claims, 1 Drawing Sheet

RECOVERY OF POLY(ARYLENE SULFIDE KETONE) AND POLY(ARYLENE SULFIDE DIKETONE) RESINS

This application is a Division of application Ser. No. 07/459,011, filed Dec. 29, 1989, now U.S. Pat. No. 5,091,509.

FIELD OF THE INVENTION

This invention relates to processes for the production and recovery of poly(arylene sulfide ketone)s or poly(arylene sulfide diketone)s.

BACKGROUND OF THE INVENTION

Poly(arylene sulfide ketone), henceforth abbreviated as PASK, and poly(arylene sulfide diketone), henceforth abbreviated as PASDK, resins are engineering thermoplastics of potential commercial interest for film, fiber, molding, and/or composite applications because of their outstanding thermal and mechanical properties. General processes for the production of PASK and PASDK are known in the art. For example, PASK and PASDK can be prepared by the reaction of an alkali metal sulfide in a polar organic compound with a polyhaloaromatic ketone or a polyhaloaromatic diketone, respectively.

Disadvantages often associated with the production of PASK and PASDK resins pertain to the recovery and handling of the polymer produced. Specifically, at the completion of a typical polymerization reaction, the reaction mixture is generally in the form of a slurry comprising a liquid phase (e.g., predominantly a polar organic compound and water) and a particulate phase (e.g., predominantly polymeric resin and by-product salts), wherein the polymeric resin when recovered is in the form of powder-like particles. These powder-like particles generally have bulk densities of less than about 10 lbs/ft$^3$ when recovered. The slurry containing this extremely fine powder-like resin filters very slowly and, thus, hampers the polymer's washability, recoverability and processability. Washing, recovering and/or processing PASK and PASDK resins, which have low bulk densities, are extremely difficult.

While a technique which increases the resin's bulk density could be advantageous to the commercial industry by improving the resin's handling, there are, however, some applications where such a technique would not be the most preferred mode for improving handling procedures. Specifically, in some commercial applications, it is necessary to have the PASK or PASDK resin in the form of a fine powder. Examples of such commercial applications include, but are not limited to, powder coating, slurry coating and some types of compounding operations.

If a technique were employed which improved handling procedures by increasing the bulk density of the PASK or PASDK resins, and if these resins were to be employed in a process requiring the polymer to be in the form of a powder, the resulting resin might have to be milled or ground. Therefore, in those applications wherein it is desirable to use PASK or PASDK resins while in a powder form, it would be advantageous to improve the handling of the respective resins while not increasing their bulk densities.

A PASK or PASDK resin should be relatively free from metal halide salts and other ash-producing contaminants to be of full usefulness and value. Another problem in the production of PASK and PASDK resins has been the separation of high purity polymer from the contaminants in its polymerization reaction slurry. The polar organic compounds generally used in polymerization processes often cause difficulty in separating the polymer from its reaction mixture slurry by such usual means as filtration since the liquid component and the polymer often produce a filter cake of such "pasty" physical characteristics that plugging of the filter is a continuous problem and washing the filter cake free of other contaminants is difficult.

To avoid these problems, methods have been proposed for removal of the non-polymeric liquid component from the polymer slurry before separation of the polymer and other contaminants is attempted. One such method is the rapid, reduced-pressure evaporation of the non-polymeric liquid component, often called a "flash-recovery" process. Generally, in a flash-recovery process, the polymerization mixture comprising the polymer product, a polar organic compound and water, is at a superatmospheric pressure and at a temperature which is greater than the atmospheric boiling points of most non-polymeric liquids present therein. This polymerization mixture is then transported across a "flash valve". This rapidly reduces the pressure exerted on the mixture and results in the vaporization of essentially all non-polymeric liquids contained therein while simultaneously solidifying the polymeric liquids in the form of a particulate resin.

STATEMENT OF THE INVENTION

One object of this invention is to provide a method for preparing low bulk density polymers having associated therewith improved recovery and handling procedures.

The PASK or PASDK resin recovered by this inventive process has associated therewith improved handling.

In accordance with one embodiment of this invention, novel PASK or PASDK resins are provided by a process comprising the steps of: (a) preparing in a first enclosed vessel a first slurry, wherein the solid component thereof comprises a first particulate resin selected from the group consisting of PASK and PASDK, and wherein the liquid component thereof comprises a polar organic compound and water; (b) substantially liquifying the first particulate resin contained in the first slurry to form a first mixture which comprises the substantially liquified resin and the polar organic compound and water; (c) subjecting the first mixture to a concentration step to evaporate at least a portion of the water and the polar organic compound contained therein to form a second mixture; and (d) flashing the second mixture into a second vessel, wherein the internal pressure of the second vessel is substantially lower than that of the first enclosed vessel containing the heated liquid mixture, thereby removing a portion of the remaining water and a portion of the polar organic compound therefrom and simultaneously solidifying the substantially liquified resin to form a novel second particulate PASK or PASDK resin.

In accordance with another embodiment of this invention, novel PASK or PASDK resins are provided by a process comprising the steps of: (a) preparing in a first enclosed vessel a first slurry, wherein the solid component thereof comprises a first particulate resin selected from the group consisting of PASK and PASDK, and wherein the liquid component thereof comprises a polar organic compound; (b) substantially liquifying the first particulate resin contained in the first slurry to form a first mixture which comprises the substantially liquified resin and the polar organic compound; and (c) flashing the first mixture into a second vessel, wherein the internal pressure of the second vessel is substantially lower than that of the first enclosed vessel containing the heated mixture, thereby removing essentially all of the polar organic compound therefrom and simultaneously solidifying the substantially liquified resin to form a novel second particulate PASK OR PASDK resin.

In accordance with yet another embodiment of this invention, novel PASK or PASDK resins are provided by a process comprising the steps of: (a) preparing in a first enclosed vessel a first slurry heated to a temperature of at least about 100° C. (212° F.), wherein the solid component thereof comprises a first particulate resin selected from the group consisting of PASK and PASDK, and wherein the liquid component thereof comprises a polar organic compound and water; (b) venting vapors from the enclosed first vessel containing the heated first slurry, thereby removing at least a portion of the water therefrom; (c) substantially liquifying the first particulate resin contained in the first slurry to form a first mixture which comprises the substantially liquified resin and the polar organic compound; and (d) flashing the first mixture into a second vessel, wherein the internal pressure of the second vessel is substantially lower than that of the first enclosed vessel containing the heated mixture, thereby removing a portion of the polar organic compound therefrom and simultaneously solidifying the substantially liquified resin to form a novel second particulate PASK or PASDK resin.

When practicing any of the embodiments of this invention, the handling of the novel second particulate resin is significantly improved over that of the first particulate resin.

DETAILED DESCRIPTION OF THE INVENTION

Figure 1:
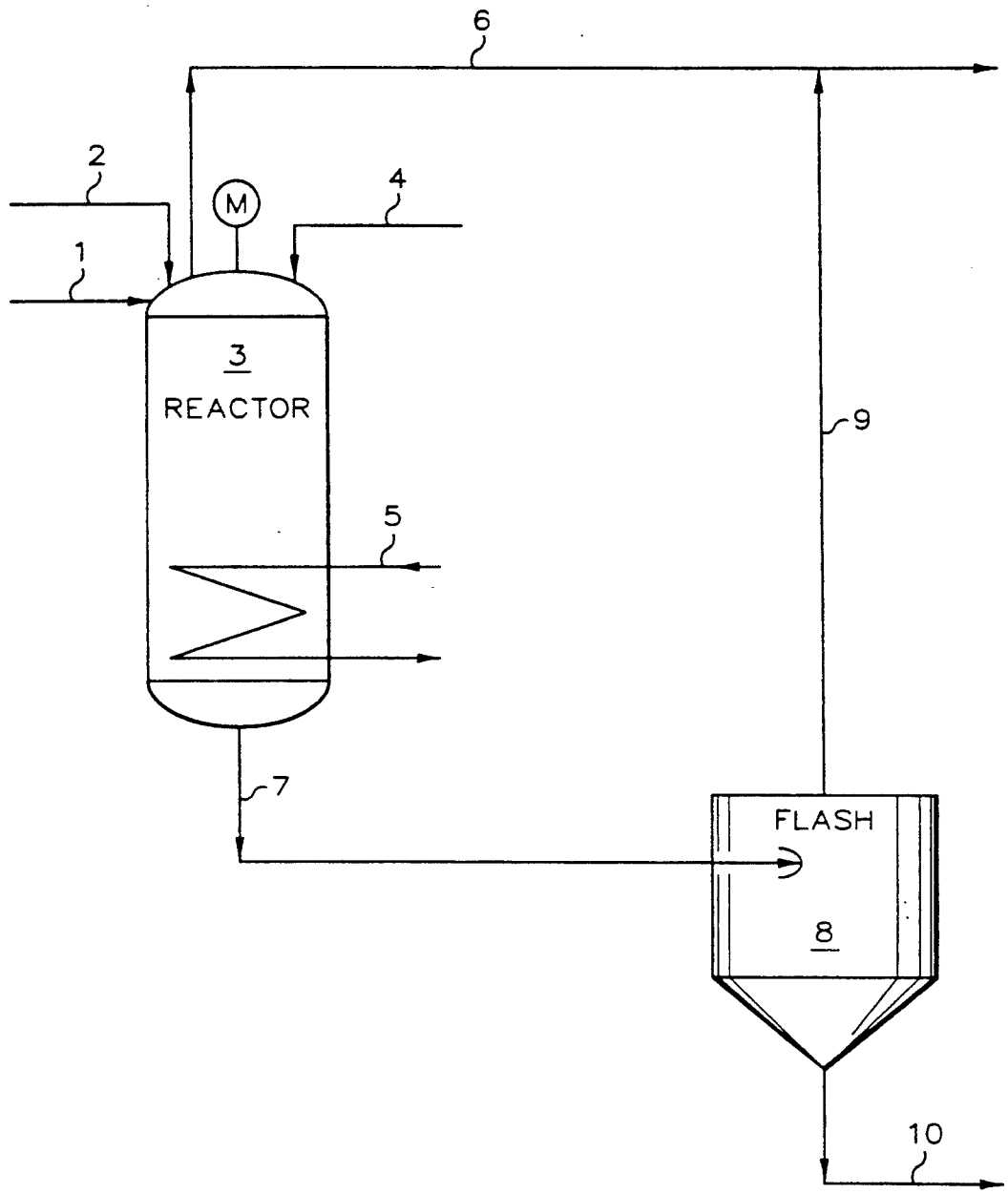

As used herein, the term "bulk density" refers to the density of a dry, particulate resin. A resin's bulk density is determined herein by completely filling a container, having a known weight and volume, to its brim with a dried sample of the polymer to be tested. The bulk density of the specific polymer is then calculated by dividing the weight of the polymer in pounds (lbs) by the volume of the container in cubic feet (ft$^3$). The bulk density of resin formed in typical PASK and PASDK polymerization processes is often less than about 10 lbs/ft$^3$.

Bulk density of dry, particulate resins can be determined in terms of "loose" bulk density and/or "compacted" bulk density. The loose bulk density of a dried granular polymeric resin is determined by measuring the weight of the polymer as it naturally fills the test container to its brim by gravity. On the other hand, the compacted bulk density of a dry, particulate resin is determined by physically compacting the polymer in the test container, until the compacted polymer reaches the brim thereof, prior to weighing the amount of polymer contained therein. When the term "bulk density" is used herein, it refers to the resin's loose bulk density.

The polymers which are treated by the process of this invention are those having the repeating unit:

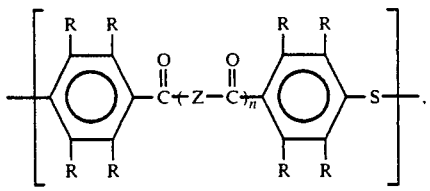

$n = 0$ or 1, $Z$ = divalent radical selected from

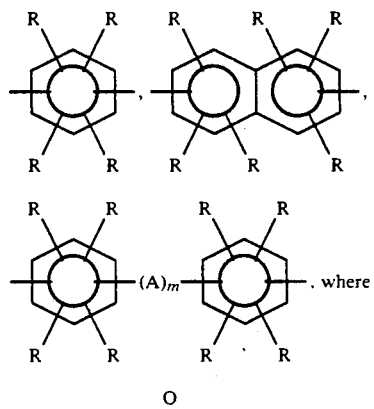

$m = 0$ or 1, A is selected from O, S, C, SO$_2$, CR$_2$, and R is hydrogen or an alkyl radical having 1–4 carbon atoms.

Although other polymeric resins are not excluded, in general, the presently preferred PASK resins produced and/or recovered by the inventive process disclosed herein are poly(phenylene sulfide ketone) resins (PPSK) having as the repeating unit:

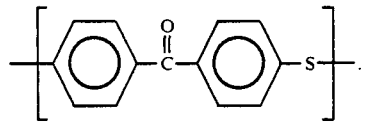

In general, the preferred PASDK resins produced and/or recovered by the inventive process herein are poly(phenylene sulfide diketone) resins (PPSDK) having as the repeating unit

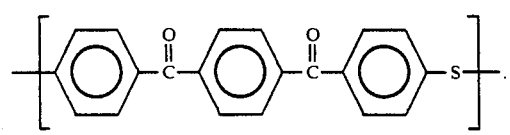

When practicing the embodiments of this invention, if desired, the novel second particulate resin can thereafter be separated, washed, and optionally dried in accordance with known techniques.

When employing any of the embodiments of this invention, the handling of the novel second particulate resin is significantly improved over that of its respective first particulate resin.

Since this invention can be practiced at any time after a first particulate PASK or PASDK resin is formed, it can be viewed as either (1) an effective means for improving the handling of PASK or PASDK resins without materially increasing the resins' respective bulk densities, or (2) a means for providing novel low bulk density PASK or PASDK resins which have associated therewith improved handling.

When practicing this invention, a first slurry is prepared, wherein the solid component thereof comprises a first particulate resin selected from the group consisting of PASK and PASDK, and wherein the liquid component thereof comprises a polar organic compound. Any suitable method can be employed to prepare the first slurry of this invention.

An example of a suitable method which will produce such a first slurry is one wherein a polyhalo-substituted aromatic ketone or diketone is contacted, under suitable polymerization conditions, with reactants comprising: (a) a sulfur source; (b) a polar organic compound; and (c) water. Under these conditions, a first slurry results, wherein the solid component thereof comprises a first particulate PASK or PASDK resin (having a bulk density generally less than about 10 lbs/ft$^3$ when recovered and dried), and wherein the liquid component thereof comprises the polar organic compound and water.

Another example of a suitable method which results in such a first slurry comprises taking a PASK or PASDK resin which has already been prepared, recovered, and optionally dried, and adding this resin to a liquid comprising a polar organic compound and, optionally, water.

If certain embodiments of this invention are being practiced, the liquid component of the first slurry will also comprise water. For one embodiment of this invention, the first slurry is heated to a temperature of at least about 100° C. (212° F.), preferably at least about 200° C. (392° F.). Any suitable method can be employed to prepare this heated first slurry. One example of a suitable method which will produce such a heated first slurry is the polymerization process recited above. Another example of a suitable method which results in such a heated first slurry comprises taking a PASK or PASDK resin which has already been prepared, recovered, and optionally dried and adding this resin to a liquid mixture comprising a polar organic compound and water. This slurry is then heated, while in an enclosed vessel, to a temperature of at least about 100° C. (212° F.), preferably at least about 200° C. (392° F.).

When practicing this invention, the molar ratio in the first slurry of the moles of polar organic compound per moles of divalent sulfur present in the first particulate resin is generally determined by mechanical and/or economic limitations. If the first slurry is that resulting from a polymerization reaction, the molar ratio of the moles of polar organic compound to the moles of divalent sulfur employed as a reactant ranges from about 3:1 to about 25:1; more preferably, from about 6:1 to about 20:1; and even more preferably, from about 8:1 to about 16:1.

Polar organic compounds which can be employed when practicing this invention are those which remain substantially in a liquid phase at the temperatures and pressures used for liquifying the first particulate resin. Moreover, these polar organic compounds should preferably also function as solvent of the first particulate resin. Generally, organic amides are employed as the polar organic compounds. Suitable organic amides can be cyclic or acyclic and can have from 1 to about 10 carbon atoms per molecule. Examples of suitable organic amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone (NMP), N,N'-ethylenedi-2-pyrrolidone, hexamethylphosphoramide, tetramethylurea, 1,3-dimethyl-2-imidazolidinone and mixtures thereof. NMP is the presently preferred organic amide.

PASK and PASDK resin polymerizations generally employ polymerization temperatures ranging from about 232° C. (450° F.) to about 288° C. (550° F.). At the termination of typical PASK or PASDK polymerization reactions, a heated first slurry is generally formed. This heated first slurry comprises a particulate PASK or PASDK resin as the solid component and a mixture containing predominantly a polar organic compound and water as the liquid component. At the termination of the polymerization, the reactor pressure will generally range from about 200 psig to about 500 psig.

Substantial liquification of the first particulate PASK or PASDK resin contained in the first slurry can be accomplished by using any suitable liquification process known by those skilled in the art. One example of such a suitable liquification process is heating the slurry to a temperature at which the first particulate resin liquifies. It is noted, however, that since the liquid component of the slurry containing the resin generally comprises a polar organic compound which can also function as a solvent for the first particulate resin, the elevated temperature of the aforementioned resin liquification process will generally not exceed the melting point of first particulate resin. For example, if the solid component of a slurry comprises, as the first particulate resin, poly(phenylene sulfide ketone) (PPSK), and the liquid component of the same slurry consists essentially of the polar organic compound, NMP, in order to liquify this particulate resin, this slurry must be heated to a temperature of at least about 280° C. (536° F.), which does not exceed the melting temperature of PPSK (about 340° C.).

Another example of a suitable liquification process is the addition of a suitable compound which can function as a solvent of the particulate resin. Depending upon the type and/or amount of this compound being subsequently added to the first slurry and the characteristics of the first particulate resin, it may still be necessary to elevate the temperature of the first slurry in order to liquify the first particulate resin contained therein. Moreover, if other liquid components are present in the first slurry, the temperature needed to substantially liquify the first particulate PASK or PASDK resin contained therein generally increases. For example, if the solid component of a slurry comprises as the first particulate resin PPSK and the liquid component of the same slurry consists essentially of the polar organic compound, NMP, and a small amount of water (e.g., approximately 10% by weight of liquid component), in order to liquify this specific particulate resin, this slurry must be heated to a temperature of at least about 300° C. (572° F.).

In one embodiment of this invention, prior to the substantial liquification of the resin, the enclosed vessel containing the heated first slurry is vented, such that at least a portion of the water is removed therefrom. In order to practice this technique, the temperature of the first slurry must be above about 100° C. (212° F.), preferably above about 200° C. (392° F.). After the enclosed vessel has been vented, the liquid component of this vented first slurry is predominantly polar organic compound. Thereafter the resin is substantially liquified, often at a lower temperature and/or pressure than if the venting step had not been employed.

For example, if the first particulate resin contained in the vented first slurry is PPSK, and if the polar organic compound is NMP, the PPSK resin generally can be substantially liquified by heating the vented slurry to a temperature of at least about 280° C. (536° F.), preferably, from about 280° C. (536° F.) to about 350° C. (662° F.), and more preferably, from about 290° C. (554° F.) to about 300° C. (572° F.).

After the first particulate PASK or PASDK resin has been substantially liquified, the non-polymeric liquid components are separated from the polymeric liquid components of the first mixture. In accordance with this invention, the separation of the substantially liquified resin is effectuated by a process referred to as "flash-recovery".

The separation of the non-polymeric liquid components from the polymeric liquid component can be effectuated in either a one-stage or a two-stage flash-recovery process.

In the one-stage flash-recovery process the heated first mixture, which is at a superatmospheric pressure, is transferred across a flash valve to a vessel maintained at pressure significantly lower than the specific superatmospheric pressure. This results in a rapid decrease in pressure exerted on the heated mixture. This rapid decrease in pressure results in vaporizing a portion of the non-polymeric liquid components while simultaneously solidifying essentially all of the polymeric liquid components. The resulting novel second particulate resin is generally in the form of a feathery material.

In the two-stage flash-recovery process, the heated liquid mixture which is at a superatmospheric pressure is first concentrated by venting vapors therefrom, such that a portion of the non-polymeric liquid components vaporize and are thereafter removed therefrom. This concentration step is preferably employed when water is one of the non-polymeric liquid components present in the first mixture. If water is present, the concentration step is preferably conducted until essentially all of the water is removed therefrom. After the concentration step, a major portion of the resin should still be in a liquid phase. If not, the resin should be substantially liquified prior to proceeding to the next step of this process. After the concentration step, the remaining mixture is transferred across a flash valve to a vessel maintained at a pressure significantly lower than the pressure exerted on the concentrated mixture.

While the conditions employed in the concentration step of the two-stage flash-recovery process can vary, the pressure during this step will generally be above atmospheric pressure. However, sub-atmospheric pressure operation is to be considered as within the scope of this invention. The pressure reduction during the concentration step should be sufficient to evaporate essentially all of the water, if present, and at least a portion of the polar organic compound present. Generally, the pressure reduction should be such that at least one-third of the polar organic compound present vaporizes; preferably, such that at least one-half of that present vaporizes.

When employing either the one- or two-stage flash-recovery process recited above, the atmospheric pressure of vessel into which the mixture is flashed must be lower than the pressure of the vessel containing the mixture. This pressure difference can vary depending upon (1) the amount and characteristics of the specific polymeric and non-polymeric liquid components of the mixture and (2) the amount and/or type of non-polymeric liquid component(s) desired to be removed from the mixture.

Generally, the pressure of the vessel into which the heated mixture is flashed is from about 20 to about 100 percent, preferably, from about 50 to about 95 percent less than that of the vessel containing the liquid mixture. For example, under typical operating conditions, the internal pressure of the vessel containing the mixture ranges from about 75 to about 500 psia, preferably, from about 100 to about 300 psia. Under these conditions, the internal pressure of the vessel into which the mixture is flashed ranges from about 1 to about 60 psia, preferably, from about 10 to about 30 psia.

The operation of this invention can best be understood by reference to the drawing which shows a method for recovering a novel second particulate PASK and PASDK resin from a heated first slurry, wherein the liquid component comprises a polar organic compound and water, by employing the two-stage flash-recovery process. The drawing will be described in terms of the recovery of PPSK, however, the process illustrated therein can easily be adapted to PASK or PASDK by those of ordinary skill in the art.

In FIG. 1, sodium hydroxide, sodium hydrosulfide, N-methyl-2-pyrrolidone (NMP) and water are charged into reactor 3 through line 1. The polyhaloaromatic compound 4,4'-dichlorobenzophenone is charged into reactor 3 through line 2. The contents of reactor 3 are subject to an elevated temperature of about 250° C. (482° F.) and an elevated pressure in the range from about 100 psig to about 120 psig to produce a polymerization reaction slurry wherein the solid component thereof comprises a first particulate PPSK resin and salt by-products, and wherein the liquid component thereof comprises NMP, water, by-product alkali metal halide, and other impurities.

At the end of the polymerization, the concentration step can be carried out. If desired, the concentration step can be conducted in the same vessel by supplying the necessary heat input through coil 5 and driving off water and NMP through line 6. This concentration step is continued until essentially all of the water and preferably up to about 50% of the NMP is removed from the liquid mixture.

After the concentration step, reactor 3 is sealed and thereafter heated by coil 5 to an elevated temperature of at least about 280° C. (536° F.) to form a predominantly liquid mixture comprising substantially liquified PPSK resin and NMP. The liquid mixture in reactor 3 is removed therefrom through line 7 to flash vessel 8 through a flash valve. The mixture from reactor 3, which is at a superatmospheric pressure, is flashed into vessel 8 to approximately atmospheric pressure. This flashing process results in the vaporization and removal of a portion of the non-polymeric liquid components, while simultaneously solidifying the polymeric liquid component. The vaporized non-polymeric liquid components are removed from vessel 8 through line 11.

The particulate material remaining in flash vessel 8, which comprises the novel PPSK resin, by-product alkali metal halide and other impurities, is removed therefrom through line 10 for washing and other downstream processes. The vaporized NMP, removed from vessel 8 through line 9 and/or from reactor 3 through line 6, can be processed to remove water and other impurities therefrom and made ready for return to reactor 3.

Still in reference to FIG. 1, another method of performing the above two-stage flash-recovery process is by employing the concentration step after the particulate PPSK resin is substantially liquified. Specifically, after the polymerization slurry is prepared, reactor 3 is heated, while sealed, to a temperature of at least about 300° C. (572° F.) with coil 5 to form a predominantly liquid mixture comprising NMP, water, and substantially liquified PPSK resin. This mixture is then concentrated by venting vapors from reactor 3 through line 6. As above, this concentration step is continued until essentially all of the water and, preferably, up to about 50% of the NMP is removed from the mixture. After the concentration step, the PPSK resin should still be in a substantially liquified form. If a major portion of the PPSK resin begins to solidify, additional heat is applied by coil 5 until the resin is again substantially liquified. The concentrated mixture, which is at a superatmospheric pressure, is then removed from reactor 3 through line 7 to flash vessel 8 as described above, to result in a particulate material comprising the novel PPSK resin.

The thermal stability and processability of the resulting novel second particulate resin prepared in accordance with this invention can be improved by subjecting the novel second particulate resin to a caustic treating process. This subsequent treating process is conducted at an elevated temperature with a suitable base, such as an alkali metal carbonate or an alkali metal hydroxide.

Another means of improving the thermal stability and processability of the resulting novel second particulate resin, is by treating the resulting novel second particulate resin at an elevated temperature, with water-soluble calcium cations. The process of subsequently treating the resulting novel second particulate resin with either a base or the calcium cations or both can be carried out with conventional equipment. A convenient method for carrying out a subsequent treating procedure is to first recover the novel second particulate resin from the second slurry. The recovered novel second particulate resin is then contacted with the base and/or the calcium cations, in any sequence, in an enclosed vessel which has provided therein a means of agitation. This contacting can be carried out in a single vessel or in a plurality of vessels.

EXAMPLES

The examples which follow are intended to assist in a further understanding of this invention. Particular materials employed, species, and conditions are intended to be illustrative of the invention and are not meant to limit the reasonable scope thereof.

EXAMPLE I

This example demonstrates one embodiment of this invention. The PASK resin used in this example was poly(phenylene sulfide ketone), henceforth PPSK.

The PPSK used in this example was prepared by reacting, in a stirred 2-gallon reaction vessel, the following reagents which were previously deoxygenated by three pressurize-release cycles using nitrogen: 504 grams (2.0 moles) of the monomer 4,4'-dichlorobenzophenone (4,4'-DCBP), 192 grams of a 58.3 weight-% sodium hydrosulfide (NaHS) solution (i.e., 112 grams (2.0 moles) NaHS and 80 grams (4.4 moles) water), 80 grams (2.0 moles) of sodium hydroxide (NaOH), 2400 ml (24.86 moles) of N-methyl-2-pyrrolidone (NMP), and 108 ml (6.0 moles) of water, at 250° C. for approximately 3 hours.

During the three hour polymerization period, a first slurry was produced wherein the solid component was predominantly particulate PPSK (although a certain amount of NaCl was also present) and the liquid component was predominantly a mixture of NMP and water. The temperature of the first slurry at this point was approximately 250° C.

The particulate PPSK was then substantially liquified by heating the slurry to 300° C. while increasing the mixer speed. The internal pressure of the reactor at 300° C. was approximately 380 psig.

After liquification of the particulate PPSK resin, the mixture was permitted to flash to atmospheric pressure. This flashing process was accomplished by quickly pressurizing the mixture in the reaction vessel through an induction tube and a control valve into a 1000 ml flashing cylinder maintained at atmospheric pressure. The flashing process resulted in the solidification of the substantially liquified resin. The particulate resin collected in the flashing cylinder after the flashing process is hereinafter referred to as Resin 1. After removing Resin 1 from the flashing cylinder, the resin was washed by being slurried with approximately one gallon of water and then filtered. The water was filtered from the slurry containing Resin 1 in less than 1 minute.

For the purpose of further demonstrating the effectiveness of the present invention, four additional PPSK resins (Resins 2–5, inclusive) were prepared.

Resin 2 was prepared in substantially the same manner as Resin 1. Resins 3 through 5 were prepared in the same manner as Resins 1 and 2, with the modification that the polymerization reactor during the preparation of Resins 3 and 5 was vented at 250° C. prior to heating the slurry to 300° C. Properties of Resins 1–5 are listed in Table I.

For comparison, two polymeric samples (Resins 6 and 7) were prepared using a polymerization process which did not include a flash-recovery step. The means employed for recovering Resins 6 and 7 from the completed polymerization reaction mixture is referred to as a "liquid-quench" recovery process. Both Resins 6 and 7 were initially prepared in substantially the same manner as Resin 1.

The recovery of Resins 6 and 7 from their respective polymerization reaction mixtures consisted of heating the reaction mixture slurry to a temperature of 300° C. while simultaneously increasing the stirrer speed to 500 rpm. After this temperature was obtained, 500 cc (27.8 moles) of water were charged into the respective reactors. Following the charging of the water, the respective reactors were cooled to approximately room temperature. Opening these reactors revealed granular particles of PPSK which were subsequently recovered by filtration. The recovered granular PPSK resins were then washed with water and permitted to dry. This recovered material is hereinafter referred to as Resins 6 and 7, respectively. The properties of Resins 6 and 7 are also given in Table I.

TABLE 1

| Comparison of Polymer Recovery Techniques | | | |
|---|---|---|---|
| Resin No. | Venting[a] | Recovery Technique | Bulk Density[b] (lbs/ft$^3$) |
| 1 | NO | FLASH | 6.0 |
| 2 | NO | FLASH | 6.3 |

TABLE 1-continued

Comparison of Polymer Recovery Techniques

| Resin No. | Venting[a] | Recovery Technique | Bulk Density[b] (lbs/ft³) |
|---|---|---|---|
| 3 | YES | FLASH | 6.6 |
| 4 | YES | FLASH | 6.2 |
| 5 | YES | FLASH | 6.5 |
| 6 | NO | QUENCH | 19.8 |
| 7 | YES | QUENCH | 21.0 |

[a]This column identifies those resins which were prepared by employing a venting step at 250° C. prior to heating the slurry to 300° C.
[b]This identifies the loose bulk densities of the resins.

The data in Table I demonstrates that Resins 1-5, which were recovered by the flash-recovery process, exhibited a much lower bulk density than similar resins recovered by the liquid quench recovery process (Resins 6 and 7).

To illustrate the improvement in filtration rate realized by the utilization of the flash-recovery process, the following resin (Resin 8) was prepared using a recovery process other than the flash-recovery.

Resin 8 was prepared by reacting the following deoxygenated reagents in a stirred one-gallon reaction vessel: 502 grams (2.0 moles of the monomer 4,4'-DCBP, 192 grams of a 58.3 weight-% of NaHS solution (i.e., 112 grams (2.0 moles) NaHS and 80 grams (4.4 moles) water), 80 grams (2.0 moles) of NaOH, 2400 mL (24.86 moles) of NMP, and 108 grams (6.0 moles) of water, at 250° C. for approximately 3.5 hours. During the 3.5 hour polymerization period, a first slurry was produced wherein the solid component was predominantly particulate PPSK and the liquid component was predominantly a mixture of NMP and water. The temperature of the first slurry at this point was approximately 250° C.

The particulate PPSK was then substantially liquified by heating the slurry to 305° C. After that temperature was reached, the contents of the reaction vessel were permitted to cool at a rate of approximately 1° C./minute. When the reactor and its contents had cooled to approximately room temperature, a second slurry had been formed wherein the solid component thereof comprised predominantly Resin 8.

Resin 8 was then separated from the liquid contents of a second slurry. Thereafter, Resin 8 was washed by being slurried with approximately one gallon of water and then filtered. The water was filtered from the slurry containing Resin 8 in about 5 minutes.

The above data demonstrates that the filtration rate observed when employing the flash-recovery process of this invention (less than one minute) was significantly faster than if the inventive recovery process were not employed (five minutes).

EXAMPLE 2

This Example demonstrates the use of the inventive recovery process on a commercial scale.

To a large, stirred reaction vessel was charged the following deoxygenated reagents: 84.9 pounds of 4,4'-DCBP, 28.07 pounds of a 47.1 weight-% aqueous sodium hydroxide solution, 30.32 pounds of an aqueous solution which was 58.80 weight percent NaHS and 0.30 weight-% sodium sulfide, 0.53 pounds of sodium carbonate and 31.4 gallons of NMP. The reaction vessel was then sealed and heated to approximately 249° C. (481° F.) and held there for approximately 2.5 hours. At this point, the pressure in the reaction vessel was increased 30 psig by the addition of carbon dioxide. The time required for the carbon dioxide addition and continued hold at 481° F. was 30 minutes.

The reactor was then heated to 287° C. (548° F.), at which point the reactor contents were transferred across a flash valve to separate the product polymer from most of the normally liquid components present. After the polymer recovery, which included washing and drying, a total of 29 pounds of polymer was collected. Hereinafter, this polymer is referred to as Resin 9.

To further illustrate the use of the inventive process on a larger scale, Resin 10 was prepared in the same general way as was Resin 9. Differences in the preparation of Resin 10 include the following: (a) at the addition of the carbon dioxide with its total of 30 minutes addition and hold time, the reactor was vented over a period of 1 hour and 46 minutes from a pressure of 210 psig to 75 psig. The reactor was then heated to 550° F. and subjected to flash-recovery in the same manner as was Resin 9. The total weight of Resin 10 which was recovered weighed 49.5 pounds.

It is evident from the foregoing that various modifications can be made to the embodiments of this invention without departing from the spirit and scope thereof, which will be apparent to those skilled in the art. Having thus described the invention, it is claimed as follows.

That which is claimed is:

1. A process for preparing a particulate polymeric resin, having associated therewith improved handling, comprising the steps of:
   (a) preparing in an enclosed first vessel a first slurry, wherein the solid component of said first slurry comprises a first particulate resin selected from the group consisting of poly(arylene sulfide ketone) and poly(arylene sulfide diketone) resins, and wherein the liquid component of said first slurry a polar organic compound;
   (b) substantially liquifying said first particulate resin contained in said first slurry to form a first mixture which comprises said substantially liquified resin and said polar organic compound; and
   (c) flashing said first mixture into a second vessel, wherein the internal pressure of said second vessel is substantially lower than that of said first enclosed vessel containing said heated first mixture, thereby removing a portion of said polar organic compound therefrom and simultaneously solidifying said substantially liquified resin to form a second particulate resin, wherein the handling of said second particulate resin is superior to the handling of said first particulate resin.

2. A process in accordance with claim 1 wherein said first particulate resin comprises a poly(arylene sulfide ketone).

3. A process in accordance with claim 2 wherein said substantial liquification of said first particulate resin is accomplished by heating said first slurry to a temperature of at least about 300° C.

4. A process in accordance with claim 3 wherein said substantial liquification of said first particulate resin is accomplished by heating said first slurry to a temperature in the range from about 300° C. to about 325° C.

5. A process in accordance with claim 2 wherein said first slurry is prepared by reacting a polyhaloaromatic ketone, an alkali metal sulfide, and a polar organic compound under polymerization conditions.

6. A process in accordance with claim 5 wherein said polyhaloaromatic ketone is a dihalobenzophenone; said alkali metal sulfide is sodium sulfide; and, said polar organic compound is N-methyl-2-pyrrolidone.

7. A process in accordance with claim 6 wherein said dihaloaromatic ketone is 4,4'-dichlorobenzophenone.

8. A process in accordance with claim 2 wherein said poly(arylene sulfide ketone) is poly(phenylene sulfide ketone).

9. A process in accordance with claim 8 wherein said liquid component of said first slurry consists essentially of a polar organic compound.

10. A process in accordance with claim 9 wherein said substantial liquification of said first particulate resin is accomplished by heating said first slurry to a temperature of at least about 280° C.

11. A process in accordance with claim 1 wherein said first particulate resin comprises a poly(arylene sulfide diketone).

12. A process in accordance with claim 11 wherein said first slurry is prepared by reacting a polyhaloaromatic diketone, an alkali metal sulfide, water and a polar organic compound under polymerization conditions.

13. A process in accordance with claim 12 wherein said polyhaloaromatic ketone is a bis-chlorobenzoyl benzene; said alkali metal sulfide is sodium sulfide; and said polar organic compound is N-methyl-2-pyrrolidone.

14. A process in accordance with claim 11 wherein said poly(arylene sulfide diketone) is poly(phenylene sulfide diketone).

15. A process in accordance with claim 11 wherein said liquid component of said first slurry consists essentially of a polar organic compound.

16. A process in accordance with claim 1 wherein, prior to substantially liquifying said first particulate resin, the temperature of said first slurry is above about 100° C.

17. A process in accordance with claim 16 wherein, prior to substantially liquifying said first particulate resin, the temperature of said first slurry is above about 200° C.

18. A process in accordance with claim 1 wherein immediately prior to step (d), said internal pressure of said second vessel is about 50 to about 95% less than that of said first vessel.

19. A process in accordance with claim 1 wherein immediately prior to step (d), said internal pressure of said first vessel ranges from about 75 to about 500 psia, and wherein said internal pressure of said second vessel ranges from about 1 to about 60 psia.

20. A process in accordance with claim 19 wherein immediately prior to step (d), said internal pressure of said first vessel ranges from about 100 to about 300 psia, and wherein said internal pressure of said second vessel ranges from about 10 to about 30 psia.

* * * * *

UNITED STATES PATENT AND TRADEMARK OFFICE
CERTIFICATE OF CORRECTION

PATENT NO. : 5,328,981

DATED : July 12, 1994

INVENTOR(S) : Afif M. Nesheiwat et al

It is certified that error appears in the above-identified patent and that said Letters Patent is hereby corrected as shown below:

Column 12, line 37, after the word "slurry" and before the word "a" the following word should be inserted ---comprises---.

Column 12, line 67, after the word "sulfide" and before the word "and" the following word should be inserted ---water---.

Signed and Sealed this

Eleventh Day of October, 1994

Attest:

BRUCE LEHMAN

Attesting Officer

Commissioner of Patents and Trademarks